United States Patent
Gong et al.

(10) Patent No.: US 10,788,658 B2
(45) Date of Patent: Sep. 29, 2020

(54) OPTICAL CROSS CONNECTS INCLUDING MIRROR MONITORING

(71) Applicant: Futurewei Technologies, Inc., Plano, TX (US)

(72) Inventors: Jianmin Gong, San Jose, CA (US); Francis Man, Framingham, MA (US); Dongyu Geng, Shenzhen (CN); Xin Tu, Wuhan (CN); Ming Li, Wuhan (CN); Peng Zhang, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 449 days.

(21) Appl. No.: 15/866,775

(22) Filed: Jan. 10, 2018

(65) Prior Publication Data

US 2019/0212545 A1 Jul. 11, 2019

(51) Int. Cl.
| | | |
|---|---|---|
| *H04Q 11/00* | (2006.01) | |
| *G02B 26/08* | (2006.01) | |
| *G02B 6/26* | (2006.01) | |
| *G02B 6/35* | (2006.01) | |
| *G02B 27/62* | (2006.01) | |
| *G02B 6/12* | (2006.01) | |

(52) U.S. Cl.
CPC ......... *G02B 26/0833* (2013.01); *G02B 6/266* (2013.01); *G02B 6/356* (2013.01); *G02B 27/62* (2013.01); *H04Q 11/0005* (2013.01); *G02B 6/3584* (2013.01); *G02B 2006/12104* (2013.01); *H04Q 11/0062* (2013.01); *H04Q 2011/0026* (2013.01); *H04Q 2011/0041* (2013.01)

(58) Field of Classification Search
CPC ..................................... H04Q 2011/0026–003
See application file for complete search history.

(56) References Cited

U.S. PATENT DOCUMENTS

| | | | | |
|---|---|---|---|---|
| 6,668,108 B1 * | 12/2003 | Helkey | ................. | G02B 6/359 385/17 |
| 7,050,669 B2 | 5/2006 | Barrett et al. | | |
| 7,734,127 B2 | 6/2010 | Korevaar et al. | | |
| 2006/0088317 A1 * | 4/2006 | Ishii | ..................... | G02B 6/3588 398/19 |
| 2007/0040925 A1 * | 2/2007 | Hicks | .................. | H04N 5/2259 348/340 |
| 2019/0212545 A1 * | 7/2019 | Gong | .................. | G02B 6/3556 |

* cited by examiner

*Primary Examiner* — Nathan M Cors
(74) *Attorney, Agent, or Firm* — Vierra Magen Marcus LLP

(57) ABSTRACT

Optical cross connects and methods for use therewith are described herein. In an embodiment, an optical cross connect includes first and second mirror arrays, first and second light sources that respectively emit first and second color coded light beams (e.g., each of which includes red, green and blue light), and first and second cameras configured to respectively capture first and second color images of the first and second color coded light beams reflected respectively from the first and second mirror arrays. The optical cross connect also includes a controller configured to perform closed loop feedback control of the first and second mirror arrays, based on the first and second color images, when the controller controls how optical signals are transferred between individual optical fibers in a first bundle of optical fibers and individual optical fibers in a second bundle of optical fibers.

20 Claims, 6 Drawing Sheets

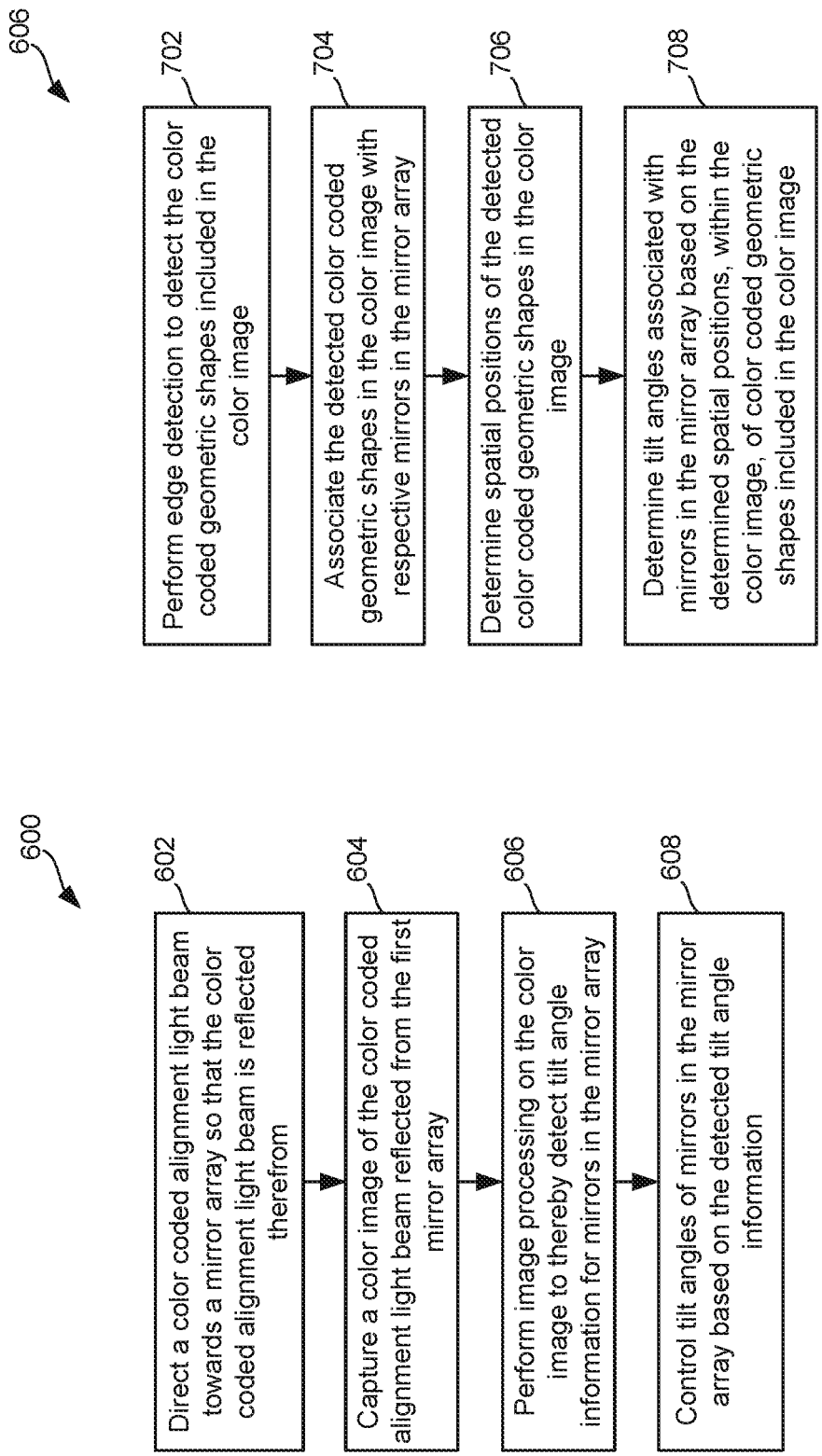

OPTICAL CROSS CONNECTS INCLUDING MIRROR MONITORING

FIELD

This disclosure generally relates to optical cross connects, and in particular, to such optical cross connects having monitoring of mirrors in mirror arrays.

BACKGROUND

Optical cross connects can be used to switch optical signals in a fiber optic network, such as a fiber optic communication system. In a typical fiber optic communication system several fibers may be bundled together with many separate signals combined within a light beam carried in each of the optical fibers in the bundle. This combination of separate signals into a single beam carried by a single fiber is called multiplexing the signals. Both time division and frequency division multiplexing may be utilized. In a typical fiber optic systems each signal carries with it a code so that traffic controls in the system can direct the signal to its proper destination. Light beams comprised of many signals typically travel serially through several or many fibers before reaching its sub-destination or final destination. Individual signals are collected into a single fiber in a process called multiplexing and separated out from other signals in a beam in processes called de-multiplexing. This operation may occur once or several times during the transit of information in the form of these light signals from sender to receiver.

Traffic controls can route a particular signal from a sender through many fibers to a receiver without changing the way the various optical fibers of the system are connected. However, as particular fiber routes become crowded, the connections between fibers may need to be modified to reduce the crowdedness or to route the signals more efficiently. This is the job of the fiber optic switch. This operation can be done by changing the actual connections between fibers in a fiber switch unit. Historically, fast switching of optical-beam routes through optical fibers had been accomplished using hybrid optical-electrical-optical switches for detection and conversion of optical signals entering the switch from a first fiber to an electrical signal that is used to produce a new optical signal for transmission over a second optical fiber.

More recently, a number of optical cross connect switches have become available for switching optical signals directly from one optical fiber to another, thereby eliminating the need to convert the optical signal to an interim electrical signal. These optical switches incorporate various optical switch elements, such as mirrors, prisms, fiber collimators, and complicated drive mechanisms, to route optical signals through the switch. For some optical switches, mirrors have been utilized. Exemplary optical cross connect switches, which can also be referred to more succinctly as optical cross connects, are described in U.S. Pat. No. 7,734,127, titled "Optical switch module," and U.S. Pat. No. 7,050,669, titled "Optical cross connect switch with axial alignment beam."

The '127 patent discloses a control system provided to position mirrors in first and second mirror arrays to optically connect any of the optical fibers in a first set of optical fibers to any optical fiber in a second set of optical fibers. The control system includes a first beam direction sensor unit positioned to detect each alignment beam in the first set of alignment beams transmitted through a dichroic mirror and a second beam direction sensor unit positioned to detect each alignment beam in the second set of alignment beams transmitted through the dichroic mirror. Each of the beam direction sensor units includes an alignment beam detection screen and a video camera for viewing the position of the intersections of the alignment beams with the unit's viewing screen. However, it is difficult to distinguish different mirrors if their reflected beams on the beam detection screen overlap one another. More specifically, during such overlap, feedback that is used to adjust positions of the mirrors does not work correctly, especially where an actual tilt angle of a mirror differs from its ideal angle. Additionally, the optical switch module of the '127 patent requires multiple beam splitters, which introduces significant power and transmission losses. Further, the way the optical switch module of the '127 patent achieves optical alignment is quite complicated.

The '669 patent teaches the use of a single beam splitter positioned halfway between first and second mirror arrays, wherein the single beam splitter directs a portion of the light reflected from the first and second mirror arrays toward a camera which is used to produce feedback for adjusting the mirrors. However, it is difficult to distinguish different mirrors if their reflected beams on the camera overlap one another. More specifically, during such overlap, feedback that is used to adjust positions of the mirrors does not work correctly, especially where an actual tilt angle of a mirror differs from its ideal angle. Further, the single beam splitter, as well as alignment beam insertion fibers, introduce significant power and transmission losses. Further, optical alignment is complicated because the optical distance between the first mirror array and the camera should be the same as the optical distance between the second mirror array and the camera.

SUMMARY

According to one aspect of the present disclosure, an optical cross connect comprises: a first collimator array including a plurality of first collimators, and a second collimator array including a plurality of second collimators; a first mirror array including a plurality of first mirrors, and a second mirror array including a plurality of second mirrors; each first mirror of the first mirror array configured to reflect a light beam, directed towards the first mirror by a respective one of the first collimators, towards a selected one of the second mirrors of the second mirror array; each second mirror of the second mirror array configured to reflect a light beam, directed towards the second mirror by the first mirror array, towards a respective one of the second collimators; a light source configured to emit a color coded light beam towards the first mirror array; a camera configured to capture a color image of the color coded light beam reflected from the first mirror array, wherein the color image includes an array of color coded geometric shapes; and a controller configured to perform image processing on the color image, and configured to control one or more of the first mirrors in the first mirror array based on results of the image processing.

Optionally, in any of the preceding aspects, the controller is configured to determine tilt angle information for one or more of the first mirrors in the first mirror array based on results of the image processing, and is configured to control tilt angles of one or more of the first mirrors in the first mirror array based on the tilt angle information.

Optionally, in any of the preceding aspects, the controller is configured to: perform edge detection to detect one or more of the color coded geometric shapes included in the color image; detect spatial positions of one or more of the detected color coded geometric shapes in the color image; associate one or more of the color coded geometric shapes in the color image with a respective one of the first mirrors in the first mirror array; and determine tilt angles associated with one or more of the first mirrors in the first mirror array based on the spatial positions of one or more of the color coded geometric shapes.

Optionally, in any of the preceding aspects, the optical cross connect further comprises: a second light source configured to emit a second color coded light beam towards the second mirror array; and a second camera configured to capture a second color image of the second color coded alignment light beam reflected from the second mirror array; wherein the controller is configured to perform image processing on the second color image to thereby determine tilt angle information for one or more of the second mirrors in the second mirror array, and configured to control tilt angles of one or more of the second mirrors in the second mirror array based on the tilt angle information.

Optionally, in any of the preceding aspects, the light source includes first, second and third light emitting elements configured to respectively emit first, second and third colors of visible light that differ from one another.

Optionally, in any of the preceding aspects, the color coded alignment light beam includes multiple different colors of light that are spatially dispersed in a non-uniform manner; and each of the color coded geometric shapes in the array of color coded geometric shapes includes a different combination of the multiple different colors of light and corresponds to a different one of the first mirrors.

Optionally, in any of the preceding aspects, the color coded light beam reflected by the first mirror array is incident on the camera so that the camera captures the color image of the color coded light beam reflected from the first mirror array.

Optionally, in any of the preceding aspects, the optical cross connect further comprises a screen that is located at a distance from the camera; wherein the camera captures the color image of the color coded light beam reflected from the first mirror array via the screen, and the camera is smaller in size than the first mirror array.

Optionally, in any of the preceding aspects, the first mirror array includes a two-dimensional (2D) array of the first mirrors, and the second mirror array includes a 2D array of the second mirrors; and each of the first mirrors in the 2D array of first mirrors, and each of the second mirrors in the 2D array of second mirrors, comprises a bi-axial mirror configured to be tilted along first and second axes that are perpendicular to one another.

Optionally, in any of the preceding aspects, the optical cross connect is bi-directional.

According to one aspect of the present disclosure, a method for controlling one or more mirrors of an optical cross connect comprises: directing, by a light source, a color coded light beam towards a first mirror array comprising a plurality of first mirrors; capturing, by a camera, a color image of the color coded light beam reflected from the first mirror array, wherein the color image includes an array of color coded geometric shapes; processing, by a controller, the color image to decide tilt angle information for one or more of the first mirrors in the first mirror array; and controlling, by the controller, tilt angles of one or more of the first mirrors in the first mirror array based on the tilt angle information.

Optionally, in any of the preceding aspects, the method further comprises: directing, by a second light source, a second color coded light beam towards a second mirror array comprising a plurality of second mirrors, wherein the second color coded light beam includes multiple different colors of light that are spatially dispersed in a non-uniform manner; capturing, by a second camera, a second color image of the second color coded light beam reflected from the second mirror array, wherein the second color image includes an array of color coded geometric shapes; processing, by the controller, the second color image to decide tilt angle information for one or more second mirrors in the second mirror array; and controlling, by the controller, tilt angles of one or more of the second mirrors in the second mirror array based on the tilt angle information for one or more second mirrors in the second mirror array.

Optionally, in any of the preceding aspects, processing the color image to decide tilt angle information for one or more of the first mirrors in the first mirror array comprises: performing edge detection to detect one or more of the color coded geometric shapes included in the color image; associating each of one or more of the detected color coded geometric shapes in the color image with a respective one of the first mirrors in the first mirror array; determining spatial positions of one or more of the detected color coded geometric shapes in the color image; and determining tilt angles associated with one or more of the first mirrors in the first mirror array based on the determined spatial positions of one or more of the detected color coded geometric shapes in the color image.

Optionally, in any of the preceding aspects, the performing edge detection to detect one or more of the color coded geometric shapes included in the color image, comprises: detecting edge points in the color image; detecting arcs associated with the color coded geometric shapes by connecting edge points; and distinguishing between detected arcs that correspond to a first mirror in the first mirror array and detected arcs that do not correspond to a first mirror in the first mirror array.

Optionally, in any of the preceding aspects, the color coded light beam includes first, second, and third colors of visible light that differ from one another; and wherein the associating one or more of the color coded geometric shapes in the color image with a respective one of the first mirrors in the first mirror array comprises: calculating first and second color ratios, for at least one pixel on or near at least one of the detected arcs, wherein the first color ratio is a ratio of the first color relative to the third color, and the second color ratio is a ratio of the second color relative to the third color; and associating one or more of the color coded geometric shapes in the color image with a respective one of the first mirrors in the first mirror array based on the first and second color ratios.

Optionally, in any of the preceding aspects, the color coded alignment light beam includes multiple different colors of light that are spatially dispersed in a non-uniform manner; and each of the color coded geometric shapes in the array of color coded geometric shapes includes a different combination of the multiple different colors of light and corresponds to a different one of the first mirrors.

According to one aspect of the present disclosure, a controller to control an optical cross connect comprises: a non-transitory memory storage comprising instructions; and one or more processors in communication with the memory, wherein the one or more processors execute the instructions to: perform edge detection to detect one or more of a color coded geometric shapes included in a color image of a color coded light beam reflected by a first mirror array comprising a plurality of first mirrors; detect spatial positions of one or more of the detected color coded geometric shapes in the color image; associate one or more of the color coded geometric shapes in the color image with a respective one of the first mirrors in the first mirror array; determine tilt angle information associated with one or more of the first mirrors in the first mirror array based on the spatial positions of one or more of the color coded geometric shapes; and control tilt angles of one or more of the first mirrors in the first mirror array based on the tilt angle information.

Optionally, in any of the preceding aspects, the instructions to perform edge detection comprise instructions to: detect edge points in the color image; detect arcs associated with the color coded geometric shapes by connecting edge points; and distinguish between detected arcs that correspond to a first mirror in the first mirror array and detected arcs that do not correspond to a first mirror in the first mirror array.

Optionally, in any of the preceding aspects, the color coded light beam includes first, second, and third colors of visible light that differ from one another; and the instructions to associate one or more of the color coded geometric shapes in the color image with a respective one of the first mirrors in the first mirror array comprise instructions to: calculate first and second color ratios, for at least one pixel on or near at least one of the detected arcs, wherein the first color ratio is a ratio of the first color relative to the third color, and the second color ratio is a ratio of the second color relative to the third color; and associate one or more of the color coded geometric shapes in the color image with a respective one of the first mirrors in the first mirror array based on the first and second color ratios.

Optionally, in any of the preceding aspects, the instructions further comprise instructions to: perform edge detection to detect one or more of a color coded geometric shapes included in a color image of a second color coded light beam reflected by a second mirror array comprising a plurality of second mirrors; detect spatial positions of one or more of the detected color coded geometric shapes in the color image of the second color coded light beam; associate one or more of the color coded geometric shapes in the color image of the second color coded light beam with a respective one of the second mirrors in the second mirror array; determine second tilt angles information associated with one or more of the second mirrors in the second mirror array based on the spatial positions of one or more of the color coded geometric shapes in the color image of the second color coded light beam; and control tilt angles of one or more of the second mirrors in the second mirror array based on the second tilt angles information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 6 is a high level flow diagram used to summarize methods according to certain embodiments of the present technology, which can be used to perform closed loop feedback to control tilt angles of mirrors within a mirror array of an optical cross connect.

FIG. 7 is a flow diagram used to describe additional details of step 606 in FIG. 6, and more specifically, used to provide details of how to perform image processing on a color image to thereby detect tilt angle information for mirrors in a mirror array, in accordance with an embodiment.

DETAILED DESCRIPTION

Figure 1:
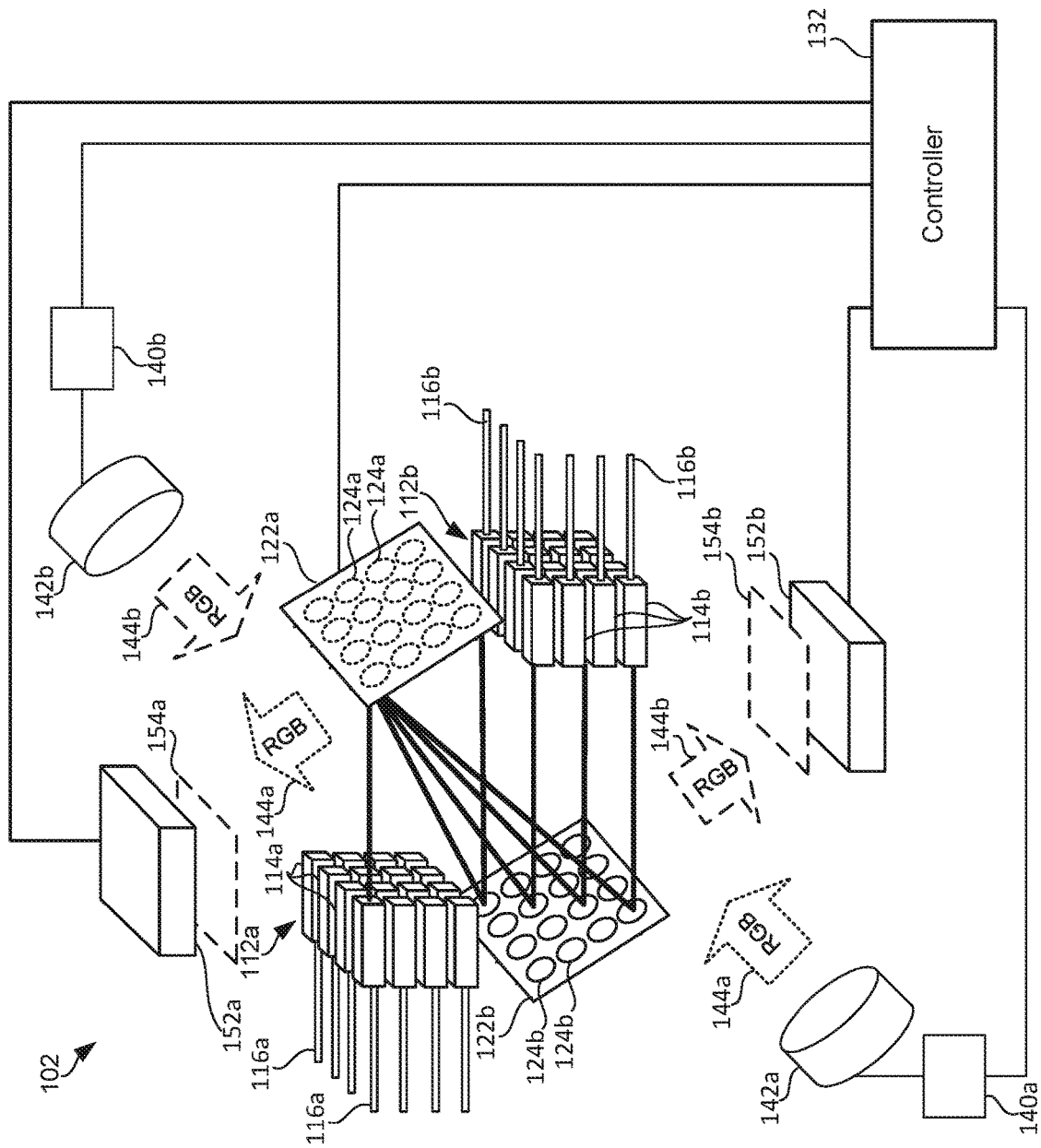
FIG. 1 illustrates an optical cross connect, according to an embodiment of the present technology.

Disclosed herein are optical cross connects and methods for use therewith. In certain embodiments, an optical cross connect includes first and second mirror arrays, first and second alignment light sources that respectively emit first and second color coded alignment light beams (e.g., each of which includes red, green and blue light), and first and second cameras configured to respectively capture first and second color images of the first and second color coded alignment light beams reflected respectively from the first and second mirror arrays. The optical cross connect also includes a controller configured to perform closed loop feedback control of the first and second mirror arrays, based on the first and second color images, when controlling how optical signals are transferred between individual optical fibers in a first bundle of optical fibers and individual optical fibers in a second bundle of optical fibers. Beneficially, by using the first color coded alignment light beam, within the first image each geometric shape (e.g., ellipse) that represents one of the mirrors in the first mirror array will have its own unique combination of colors, enabling the various mirrors represented in the first color image to be distinguished from one another, even if the geometric shapes (e.g., ellipses) overlap with one another. Similarly, by using the second color coded alignment light beam, within the second color image each geometric shape (e.g., ellipse) that represents one of the mirrors in the second mirror array will have its own unique combination of colors, enabling the various mirrors represented in the second color image to be distinguished from one another, even if the geometric shapes (e.g., ellipses) overlap with one another. Another benefit of such embodiments is that the use of beam splitters to monitor mirror alignments is avoided, thereby eliminating signal losses that would otherwise be caused by such beam splitters.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to the same or similar parts or elements throughout. In addition, the first digit of a three digit reference number, and the first two digits of a four digit reference number, identifies the drawing in which the reference number first appears.

FIG. 1 illustrates an optical cross connect 102, according to an embodiment of the present technology. The optical cross connect 102 is shown as including a first collimator array 112a, a first mirror array 122a, a second mirror array 122b, and a second collimator array 112b. The optical cross connect 102 is also shown as including a first alignment light source 142a and a first camera 152a, and a second alignment light source 142b and a second camera 152b. The optical cross connect 102 is also shown as having a controller 132. The optical cross connect 102 is further shown as including a first driver 140a that drives the first alignment light source 142a, and a second driver 140b that drives the second alignment light source 142b. The first and second drivers 140a and 140b can be referred to collectively as the drivers 140, or individually as a driver 140. Each of the drivers 140 can include, e.g., three digital to analog converters (DACs) that are used to drive three light emitting elements of an alignment light source 142, but are not limited thereto.

The first collimator array 112a includes a plurality of collimators 114a, which can also be referred to more specifically as first collimators 114a. In FIG. 1, the first collimator array 112a is shown as including a 4×4 array of first collimators 114a, and thus, is shown as including sixteen collimators 114a. In an actual implementation, the first collimator array 112a could include many more collimators 114a than shown. For example, in accordance with an embodiment, the first collimator array 112a includes a 20×20 array of collimators 114a, and thus, four hundred collimators 114a. Similarly, the second collimator array 112b includes a plurality of collimators 114b, which can also be referred to more specifically as second collimators 114b. In FIG. 1, the second collimator array 112b is shown as including a 4×4 array of second collimators 114b, and thus, is shown as including sixteen collimators 114b. In an actual implementation, the second collimator array 112b could include many more collimators 114b than shown. For example, in accordance with an embodiment, the second collimator array 112b includes a 20×20 array of collimator 114b, and thus, four hundred collimators 114b. The first and second collimator arrays 112a and 112b can be referred to individually as a collimator array 112, or collectively as the collimator arrays 112. Similarly, the first collimators 114a and the second collimators 114b can be referred to individually as a collimator 114, or collectively as the collimators 114. In accordance with an embodiment, each of the collimators 114 includes one or more lens(es) that is/are used to cause light rays that enter the collimator to be become substantially parallel to one another such that the light rays that exit the collimator are substantially parallel to one another. More generally, each of the collimators 114 can be used to produce a respective collimated light beam. In an embodiment, each of the collimators 114 of a collimator array 112 can be implemented as a microlens, in which case the collimator array 112 can be implemented as a microlens array.

Each of the first collimators 114a in the first collimator array 112a is shown as being coupled to a respective optical fiber 116a in a first bundle or set of optical fibers. Similarly, each of the second collimators 114b in the second collimator array 112b is shown as being coupled to a respective optical fiber 116b in a second bundle or set of optical fibers. In the description herein, optical signals that are being switched may be described as being input to the optical cross connect 102 via the optical fibers 116a, and output from the optical cross connect 102 via the optical fibers 116b. However, it should be noted that the optical cross connect 102 can be bi-directional. Accordingly, it would also be possible for optical signals that are being switched to be input to the optical cross connect 102 via the optical fibers 116b, and output from the optical cross connect 102 via the optical fibers 116a. The optical fibers 116a and 116b can also be referred to individually as an optical fiber 116, or collectively as the optical fibers 116.

The first mirror array 122a includes a plurality of mirrors 124a, which can also be referred to more specifically as first mirrors 124a. In FIG. 1, the first mirror array 122a is shown as including a 4×4 array of first mirrors 124a, and thus, is shown as including sixteen first mirrors 124a. In an actual implementation, the first mirror array 122a could include many more mirrors 124a than shown. For example, in accordance with an embodiment, the first mirror array 122a includes a 20×20 array of mirrors 124a, and thus, four hundred mirrors 124a. Similarly, the second mirror array 122b includes a plurality of mirrors 124b, which can also be referred to more specifically as second mirrors 124b. In FIG. 1, the second mirror array 122b is shown as including a 4×4 array of second mirrors 124b, and thus, is shown as including sixteen mirrors 124b. In an actual implementation, the second mirror array 122b could include many more mirrors 124b than shown. For example, in accordance with an embodiment, the second mirror array 122b includes a 20×20 array of mirrors 124b, and thus, four hundred mirrors 124b. The first and second mirror arrays 122a and 122b can be referred to individually as a mirror array 122, or collectively as the mirror arrays 122. Similarly, the first mirrors 124a and the second mirrors 124b can be referred to individually as a mirror 124, or collectively as the mirrors 124. Usually, the number of the mirrors 124 equals to the number of the collimators 114. In accordance with embodiments of the present technology, each of the mirrors 124 is a bi-axial mirror that can be rotated or tilted along two axes that are perpendicular to one another, which can be referred to as an x-axis (or a horizontal axis) and a y-axis (or a vertical axis). For the sake of this discussion, it will be assumed that each mirror 124 can be tilted plus and minus 5 degrees along its x-axis, and plus and minus 5 degrees along its y-axis, and thus, it will be assumed that each mirror has a 10 degree vertical tilt angle range and a 10 degree horizontal tilt angle range. It would also be possible that the range of tilt angles for each mirror be some other values. More generally, the first mirror array 122a includes a two-dimensional (2D) array of the first mirrors 124a, and the second mirror array 122b includes a 2D array of the second mirrors 124b, wherein each of the first mirrors 124a and each of the second mirrors 124b is a bi-axial mirror configured to be tilted along first and second axes that are perpendicular to one another.

In accordance with an embodiment, each of the mirrors 124 can be a micro-electro-mechanical systems (MEMS) mirror having a 0.4 mm diameter, with a 0.1 mm spacing between adjacent mirrors 124, although other diameters and spacing are also within the scope of the embodiments described herein. Where a mirror array 122 includes a 20×20 array of mirrors each having a 0.4 mm diameter, with a 0.1 mm spacing between adjacent mirrors, the size of the mirror array can be 10 mm×10 mm. A mirror array 122 can alternatively be smaller or larger 10 mm×10 mm, depending, for example, on the number of mirrors 124 included in the mirror array 122, the size (e.g., diameter) of each of the mirrors 124, and the spacing between the mirrors 124.

Figure 3:
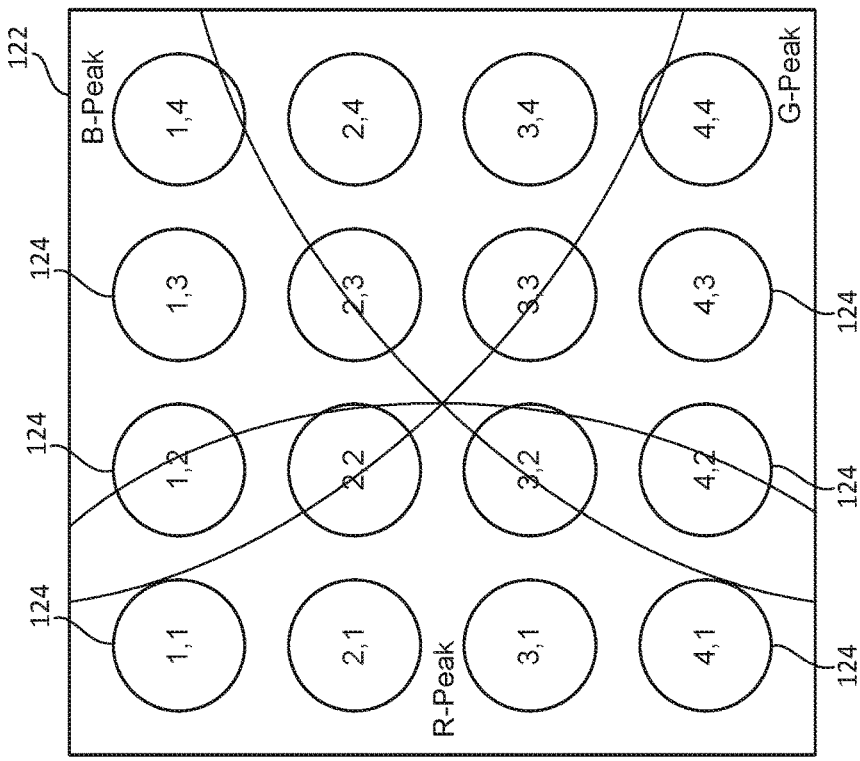
FIG. 3 is a front view of one of the mirror arrays introduced in FIG. 1.

Referring briefly to FIG. 3, FIG. 3 shows a front view of one of the mirror arrays 122. In FIG. 3, the mirror array 122 is shown as including a 4×4 array of mirrors 124. Each of the mirrors 124 is also labeled with two numbers, with the first number indicative of a row, and the second number indicative of a column. For example, the mirror 124 in the upper left of the mirror array 122 is labeled 1,1, because it is in the first row and the first column. For another example, the mirror 124 in the lower right of the mirror array 122 is labeled 4,4, because it is in the fourth row and the forth column. As noted above, each of the mirror arrays 122 will likely be much larger than a 4×4 array. Regardless of the size of the mirror array, a similar labeling scheme can be used to reference mirrors, where a first number is indicative of a row, and a second number is indicative of a column.

Each of the mirrors 124 in a mirror array 122 can be individually controlled via horizontal and vertical tilt control signals received from the controller 132 (see FIG. 1), which signals can be referred to more generally as mirror control signals. Depending upon implementation, the mirror control signals can be current signals or voltage signals. Because of tight tolerances required for proper angular alignment of the mirrors 124, and because open-loop control of the mirrors 124 is insufficient to achieve proper angular alignment of the mirrors 124 when there are environmental changes in temperature and/or atmospheric pressure, closed-loop feedback control is required, which can be performed by the controller 132. For example, assume that during a calibration process (performed at a room temperature of 20 degrees Celsius, and an atmospheric pressure of 760.00 mmHg) it was determined that specific current (or voltage) mirror control signals can be used to cause a first mirror 124a labeled 1,1 to reflect light towards a second mirror 124b labeled 4,4. Such information can be stored and used by the controller 132 during operation of the optical cross connect 102. However, if the temperature and/or atmospheric pressure during operation differs from the temperature and/or atmospheric pressure during calibration, the first mirror 124a labeled 1,1 when controlled by the mirror control signals may not appropriately reflect light towards the second mirror 124b labeled 4,4, potentially resulting in unacceptable losses. To overcome these problems, closed-loop feedback control can be used to modify the mirror control signals to compensate for the difference(es) in temperature and/or atmospheric pressure during operation relative to during calibration. Additional details of such closed-loop feedback control, according to embodiments of the present technology, are described in additional detail below.

Referring again to FIG. 1, each of the first collimators 114a (in the first collimator array 112a) can receive a separate optical signal via a respective one of the optical fibers 116a, collimates the received optical signal, and directs the collimated optical signal towards a respective one of the mirrors 124a in the first mirror array 122a. Once an optical signal has been collimated by one of the first collimators 114a and directed towards a respective one of the mirrors 124 of the first mirror array 122a, the optical signal can be referred to herein as a cross-connection light beam. Each first mirror 124a of the first mirror array 122a intercepts a cross-connection light beam output by a respective one of the first collimators 114a (in the first collimator array 112a) and reflects the cross-connection light beam towards a selected one of the second mirrors 124b of the second mirror array 122b, wherein the selected one of the second mirrors 124b can be any one of the mirrors of the second mirror array 122b. In other words, each first mirror 124a of the first mirror array 122a reflects a cross-connection light beam, directed towards the first mirror 124a by a respective one of the first collimators 114a, towards a selected one of the second mirrors 124b of the second mirror array 122b. The specific second mirror 124b that a first mirror 124a reflects a cross-connection light beam towards will depend on the tilt angles of the first mirror 124a, as controlled by the controller 132. For example, the first mirror 124a labeled 1,1 can reflect a cross-connection light beam to any of the sixteen (or other number) of second mirrors 124b (in the second mirror array 122b), including the mirrors 124b in FIG. 3 labeled: 1,1; 1,2; 1,3; 1,4; 2,1; 2,2; 2,3; 2,4; 3,1; 3,2; 3,3; 3,4; 4,1; 4,2; 4,3; and 4,4.

Referring to FIG. 1, each second mirror 124b (of the second mirror array 122b) intercepts a cross-connection light beam directed towards it by any one of the first mirrors 124a (of the first mirror array 122a) and reflects the cross-connection light beam towards a respective one of the second collimators 114b (of the second collimator array 112b). In other words, each second mirror 124b of the second mirror array 122b reflects a cross-connection light beam, directed towards the second mirror 124b by any one of the first mirrors 124a of the first mirror array 122a, towards a respective one of the second collimators 114b. Each of the second collimators 114b (of the second collimator array 112b) receives a cross-connection light beam reflected towards it by a respective one of the second mirrors 124b (of the second mirror array 122b), collimates the received cross-connection light beam, and provides the collimated light beam (which can also be referred to more generally as an optical signal) to a respective one of the optical fibers 116b.

In accordance with embodiments of the present technology, any one of the first mirrors 124a (in the first mirror array 122a) can reflect a cross-connection light beam towards any one of the second mirrors 124b (in the second mirror array 124b). Accordingly, any optical signal, provided to the optical cross connect 102 via any one of the optical fibers 116a can be switched to be provided to any of the optical fibers 116b. Thus, the optical cross connect 102 can also be referred to as an "any-to-any" optical cross connect 102, since an optical signal received via any input-port can be switched to be output via any output-port. The input-ports can be considered the inputs sides of the first collimators 114a, and the output-ports can be considered the output sides of the second collimators 114b. Since the optical cross connect 102 can be bi-directional, the second collimators 114b can also function as input-ports, and the first collimators 114a can also function as output ports.

In accordance with embodiments of the present technology, color coded alignment light beams are used to perform closed-loop feedback control of the individual mirrors 124 of each of the mirror arrays 122. More specifically, the driver 140a is used to drive the alignment light source 142a to produce a first color coded alignment light beam 144a that is directed towards and reflected from the first mirror array 122*a*. Similarly, the driver 140*b* is used to drive the alignment light source 142*b* to produce a second color coded alignment light beam 144*b* that is directed towards and reflected from the second mirror array 122*b*. The first and second color coded alignment light beams 144*a* and 144*b* can be referred to collectively as color coded alignment light beams 144, or individually as a color coded alignment light beam 144. Each of the color coded alignment light beams 114*a* and 114*b* includes multiple different colors that are spatially dispersed in a non-uniform manner within each beam.

The first color coded alignment light beam 144*a*, after being reflected from the first mirror array 122*a* can be incident on the first camera 152*a*, thereby enabling the first camera 152*a* to capture a color image of the first color coded alignment light beam 144*a* reflected from the first mirror array 122*a*. As will be described in additional detail below, the color image, captured by the first camera 152*a*, includes an array of color coded geometric shapes each of which corresponds to a different one of the first mirrors 124*a* (in the first mirror array 122*a*). Similarly, the second color coded alignment light beam 144*b*, after being reflected from the second mirror array 122*b* can be incident on the second camera 152*b*, thereby enabling the second camera 152*b* to capture a color image of the second color coded alignment light beam 144*b* reflected from the second mirror array 122*b*. The color image captured by the second camera 152*b* includes an array of color coded geometric shapes each of which corresponds to a different one of the second mirrors 124*b* (in the second mirror array 122*b*). As will be described in additional detail below, in accordance with certain embodiments of the present technology, the controller 132 performs image processing on the color images to thereby detect tilt angle information for each of the mirrors 124 (in the first and second mirror arrays 122*a* and 122*b*) and controls tilt angles of each of the mirrors 124 based on the detected tilt angle information for each of the mirrors 124.

In an alternative embodiment, the first color coded alignment light beam 144*a* reflected by the first mirror array 122*a* is incident on a screen that is located at a distance from the first camera 152*a*. Such a screen can be a rear projection screen, e.g., made from a thin film, and the first camera 152*a* can obtain its image of the reflected first color coded alignment light beam 144*a* by imaging light (of the reflected first color coded alignment light beam 144*a*) that is scattered by the screen. An example of such a rear projection screen is represented by the dashed rectangle 154*a* in FIG. 1. The screen can alternatively be a front projection screen, and the first camera 152*a* can obtain its image of the reflected first color coded alignment light beam 144*a* by imaging light (of the reflected first color coded alignment light beam 144*a*) that is reflected by the screen. By locating the first camera 152*a* at a distance from the screen (e.g., 154*a*), the size of the first camera 152*a* can be made smaller than would be possible if the first color coded alignment light beam 144*a* were incident directly on the first camera 152*a* after being reflected from the first mirror array 122*a*, in which case the first camera 152*a* would need to be as large as the first mirror array 122*a*. For example, if the size of the first mirror array 122*a* was 10 mm×10 mm, and the first color coded alignment light beam 144*a* was incident directly on the first camera 152*a* after being reflected from the first mirror array 122*a*, then the size of the first camera 152*a* (and more specifically, the size of the image sensor thereof) would need to be at least 10 mm×10 mm, which would be quite expensive. By contrast, if the size of the first mirror array 122*a* were 10 mm×10 mm, and the first color coded alignment light beam 144*a* was incident on a screen (e.g., 154*a*) located a distance from the first camera 152*a* after being reflected from the first mirror array 122*a*, then the first camera 152*a* (and more specifically, an image sensor thereof) could be smaller in size (e.g., 5 mm×5 mm), which would be significantly less expensive, reducing the overall cost of the optical cross connect 102. Similarly, the second color coded alignment light beam 144*b* reflected by the first mirror array 122*a* can be incident on a screen that is located at a distance from the second camera 152*b*, to achieve the same benefits. An example of a rear projection screen that can be imaged by the second camera 152*b* is represented by the dashed rectangle 154*b* in FIG. 1. The exemplary distances between the cameras 152*a*, 152*b* and the respective exemplary screens 154*a*, 154*b* in FIG. 1 are not drawn to scale.

Figure 2A:
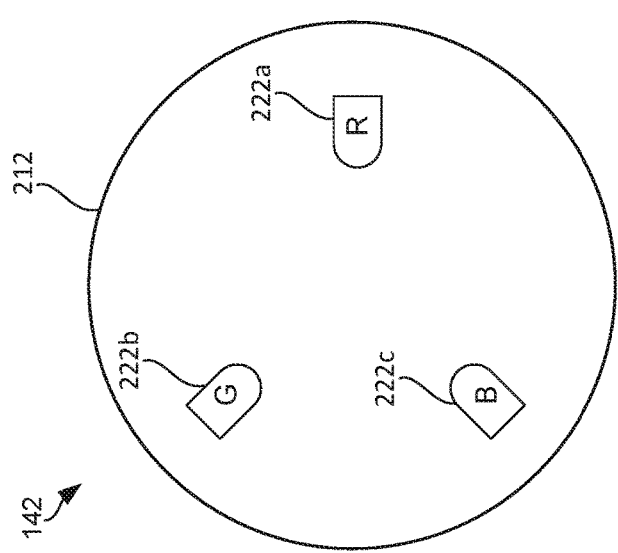
FIG. 2A is a front view of one of the alignment light sources introduced in FIG. 1.
Figure 2B:
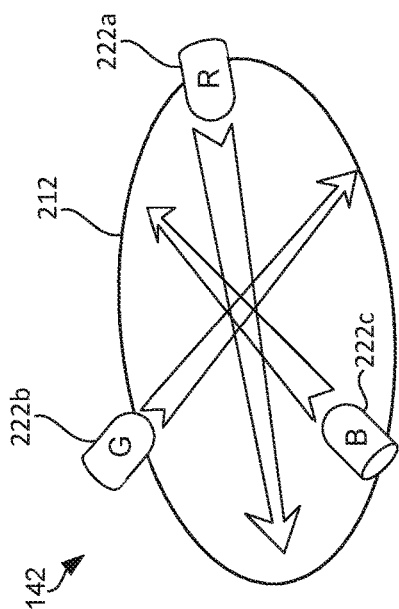
FIG. 2B is a rear perspective view of one of the alignment light sources introduced in FIG. 1, for which the front view is shown in FIG. 2A.

In accordance with an embodiment, each of the alignment light sources 142 includes first, second and third light emitting elements configured to respectively emit first, second and third colors of visible light that differ from one another. FIGS. 2A and 2B are respectively, front and rear perspective views of an alignment light source 142, according to an embodiment. Referring to FIGS. 2A and 2B, an alignment light source 142 can include a red light emitting diode (LED) 222*a* that emits red light, a green LED 222*b* that emits green light, and a blue LED 222*c* that emits blue light. The LEDs 222*a*, 222*b* and 222*c* can be referred to collectively as LEDs 222 (or more generally as light emitting elements 222), or individually as an LED 222 (or more generally, as a light emitting element 222). Alternative types of light emitting elements, besides LEDs, can be used to emit the multiple different colors of light, such as, but not limited to, laser diodes and incandescent lamps. Additionally, the alignment light source 142 can include a lens 212 that combines the red (R), green (G) and blue (B) light into the color coded alignment light beam 144.

In accordance with an embodiment, the R, G and B light emitting elements 222 can be arranged 120 degrees apart from another, e.g., in an equilateral triangle arrangement, as can be appreciated from FIG. 2A. As can be appreciated from FIG. 2B, each of the light emitting elements 222 can be pointed at an angle relative to the lens 212, such that a primary or center ray of light emitted by the light emitting element 122 is incident on the lens 212 at an acute angle. Each of the light emitting elements 222 can be offset to one side relative a center of the lens 212, and a primary or center ray of light emitted by a light emitting element 122 can be incident on the lens 212 at a location offset to the other side relative to the center of the lens 212. In accordance with an embodiment, the lens 212 combines the R, G and B light emitting by the light emitting elements to produce a combined visible light beam that is spatially distributed, such that a peak of the R light occurs where the G light and that B light are substantially at their minimums, a peak of the G light occurs where the B light and the R light are substantially at their minimums, and a peak of the B light occurs where the R light and the G light are substantially at their minimums. Such a combined light beam is an example of the color coded alignment light beam 144 that includes multiple different colors that are spatially dispersed in a non-uniform manner within the beam. Visible light of colors other than R, G and B can be used to produce the color coded alignment light beams 144. However, a benefit of using R, G and B light is that light emitting elements that emit these colors are readily available, and cameras that are capable of distinguishing between R, G and B light imaged by the cameras are also readily available, thereby enabling off-the-shelf light emitting elements and off-the-shelf cameras to be used, which is cost effective. It would also be possible to use non-visible light sources, such as various different infrared light sources, to produce an alignment light beam. However, cameras that are capable of imaging non-visible light are more expensive than cameras that are capable of imaging visible light, and thus, it is more cost effective for the color coded alignment light beams to include visible light, such as R, G and B visible light.

In accordance with an embodiment, the lens 212 outputs collimated light such that the rays of each color coded alignment light beam 144 are substantially parallel to one another. Alternatively, the lens 212 can focus the color coded alignment light beam 144 to a focal point behind the mirror array 122 at which the color coded alignment light beam 144 is directed. Regardless of whether a color coded alignment light beam 144 is collimated or focused, the footprint of the color coded alignment light beam 144 should be large enough such that it illuminates an entirety of the mirror array 122. For example, if the size of the mirror array is 10 mm×10 mm, then a diameter of the color coded alignment beach 144 can be about 15 mm. it would also be possible for each of the alignment light sources 142 to include more than one lens 212.

FIG. 3, as noted above, shows a front view of one of the mirror arrays 122, which includes a 4×4 array of mirrors 124. FIG. 3 also shows that when a color coded alignment light beam 144 is incident on the mirror array 122, peaks of R, G and B light will occur at different regions of the mirror array 122. In the example shown, the peak of the G light occurs in the lower right corner of the mirror array 122, the peak of the B light occurs in the upper right corner of the mirror array 122, and the peak of the R light occurs at the left side of the mirror array 122 halfway between the top and bottom of the mirror array 122. Accordingly, it could be appreciated from the example shown in FIG. 3 that: the portion of the color coded alignment light beam 144 incident on the mirror 124 labeled 1,4 (in the upper right corner of the mirror array 122) will primarily include B light, and may also include small amounts of R light and G light; and the portion of the color coded alignment light beam 144 incident on the the mirror 124 labeled 4,4 (in the lower right corner of the mirror array 122) will primarily include G light, and may also include small amounts of R light and B light. It can also be appreciated that: the portion of the color coded alignment light beam 144 incident on the the mirror 124 labeled 2,1 will primarily include R light, along with more B light than G light; and the portion of the color coded alignment light beam 144 incident on the the mirror 124 labeled 3,1 will primarily include R light, along with more G light than B light. More generally, each of the mirrors 124 of in the mirror array 122 will reflect a different unique combination of R, G and B light than the other mirrors 124 in the mirror array 122. The various curved lines shown in FIG. 3 are used to represent how different regions of the mirror array 122 will be illuminated by different color combinations of the R, G and B light.

Referring briefly again to FIG. 1, as explained above, the first camera 152a is configured to capture a color image of the color coded alignment light beam 144a reflected from the first mirror array 122a, whether the color coded alignment light beam 144a reflected from the first mirror array 122a is incident directly on the first camera 152a, or is incident on a rear or front projection screen (e.g., 154a) that the first camera 152a images. Similarly, the second camera 152b is configured to capture a color image of the color coded alignment light beam 144b reflected from the second mirror array 122a, whether the color coded alignment light beam 144b reflected from the second mirror array 122b is incident directly on the second camera 152b, or is incident on a rear or front projection screen (e.g., 154b) that the second camera 152b images. As shown in FIG. 3, each of the mirrors 124 in a mirror array 122 will likely be circular.

In accordance with an embodiment, each camera 152 includes an image sensor that detects and conveys information about an image. Such an image sensor can be a semiconductor charge-coupled device (CCD) image sensor or a complementary metal-oxide-semiconductor (CMOS) image sensor, but is not limited thereto. The image sensor can, for example, include a 2D array of pixels that includes 50×50 pixels for each mirror 124 of a mirror array 122. Accordingly, where a mirror array 122 includes a 4×4 array of mirrors 124, then the image sensor can include 200×200 pixels. For another example, where a mirror array 122 includes a 20×20 array of mirrors 124, then the image sensor can include 1000×1000 pixels, i.e., be a 1 Megapixel image sensor. Since each camera 152 captures color images, the image sensor of each camera 152 is a color image sensor, which can be a Bayer filter sensor, a Foveon X3 image sensor, or three-CCD (3CCD) image sensor, but is not limited thereto. Regardless of the type of color image sensor used, each pixel of the image sensor (and more generally, of the camera 152) can output R, G and B color data that is indicative of the extent of R, G and B light that is incident on the pixel. If the camera 152 is configured to detect other colors, then different color pixel data may be produced by each pixel of the camera 152. However, for the remainder of this discussion, unless stated otherwise, it will be assumed that each pixel of each camera 152 outputs R, G and B color data. Unless stated otherwise, it will also be assumed that each color data is 8 bits, which can be used to represent 256 different levels of a color. In other words, R color data includes 8 bits, B color data includes 8 bits, and G color data includes 8 bits. The color data can alternatively include more or less than 8 bits, to represent more or less different levels of a color.

Figure 4:
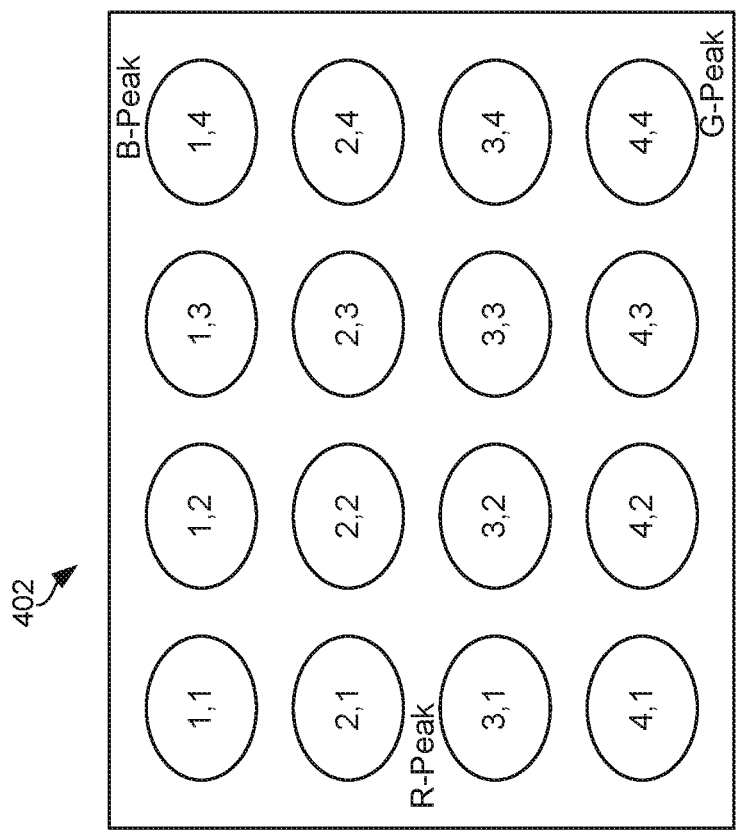
FIG. 4 shows an exemplary color image captured by one of the cameras introduced in FIG. 1 when all of the mirrors in a mirror array are not tilted.

FIG. 4 shows an exemplary color image 402 captured by the first camera 152a, when all of the first mirrors 124a of the first mirror array 122a are not tilted (and thus, are parallel to one another). As can be appreciated from FIG. 4, the color image 402 includes an array of geometric shapes, which in this example are ellipses. Each of the geometric shapes (ellipses in this example) in FIG. 4 corresponds to a different one of the first mirrors 124a of the first mirror array 122a, and is color coded such that a one-to-one correspondence between each first mirror 124a and a geometric shape (i.e., an ellipse in this example) included in the color image 402 of the reflected color coded alignment light beam 144a can be determined via image processing. More specifically, because each of the first mirrors 124a in the first mirror array 122a will reflect a different unique combination of R, G and B light than the other first mirrors 124a in the first mirror array 122a, the geometric shapes (included in the color image captured by the camera 152a) that correspond to different mirrors 124a will each include a different unique combination of R, G and B light than the other geometric shapes included in the color image 402. The ellipse labeled 1,1 in the color image 402 corresponds to the first mirror 124a labeled 1,1 in FIG. 3; the ellipse labeled 2,1 in the color image 402 corresponds to the first mirror 124a labeled 2,1 in FIG. 3; the ellipse labeled 3,1 in the color image 402 corresponds to the first mirror 124a labeled 3,1 in FIG. 3; and so on. Continuing with the above example, where the peak of the G light occurs in the lower right corner of the mirror array 122, the peak of the B light occurs in the upper right corner of the mirror array 122, and the peak of the R light occurs at the left side of the mirror array 122 halfway between the top and bottom of the mirror array 122, this can cause the ellipse labeled 1,4 (in the upper right corner of the color image 402) to primarily include B light, and include small amounts of R light and G light; and the ellipse labeled 4,4 (in the lower right corner of the color image 402) to primarily include G light, and include small amounts of R light and B light. Additionally, the ellipse labeled 2,1 in the color image 402 can primarily include R light, along with more B light than G light; and the ellipse labeled 3,1 in the color image can primarily include R light, along with more G light than B light.

Similarly, each of the geometric shapes included in a color image captured by the camera 152b will include geometric shapes (e.g., ellipses) that each correspond to a different one of the second mirrors 124b of the second mirror array 122b, and is color coded such that the ono-to-one correspondence between a second mirror 124b and a geometric shape included in the color image of the reflected color coded alignment light beam 144b can be determined via image processing.

In embodiments where the color coded alignment light beams 144 (produced by the alignment light sources 142) are collimated, the spacing between adjacent geometric shapes (e.g., ellipses) in a color image of the color coded alignment light beams 144 (after it is reflected by one of the mirror arrays 122) will be similar to the spacing between adjacent mirrors 124 in the mirror array 122, which may be about 0.1 mm when the mirrors 124 are not tilted. In embodiments where the color coded alignment light beams 144 (produced by the alignment light sources 142) are focused to a focal point behind a mirror array 122, the spacing between adjacent geometric shapes (e.g., ellipses) in a color image of the color coded alignment light beams 144 (after it is reflected by one of the mirror arrays 122) will beneficially be greater than the spacing between adjacent mirrors 124 in the mirror array 122 (e.g., greater than 0.1 mm when the mirrors 124 are not tilted), which makes image processing of a corresponding color image simpler and more accurate, because the extent of overlapping geometric shapes (e.g., ellipses) in the color image will be reduced.

Figure 5:
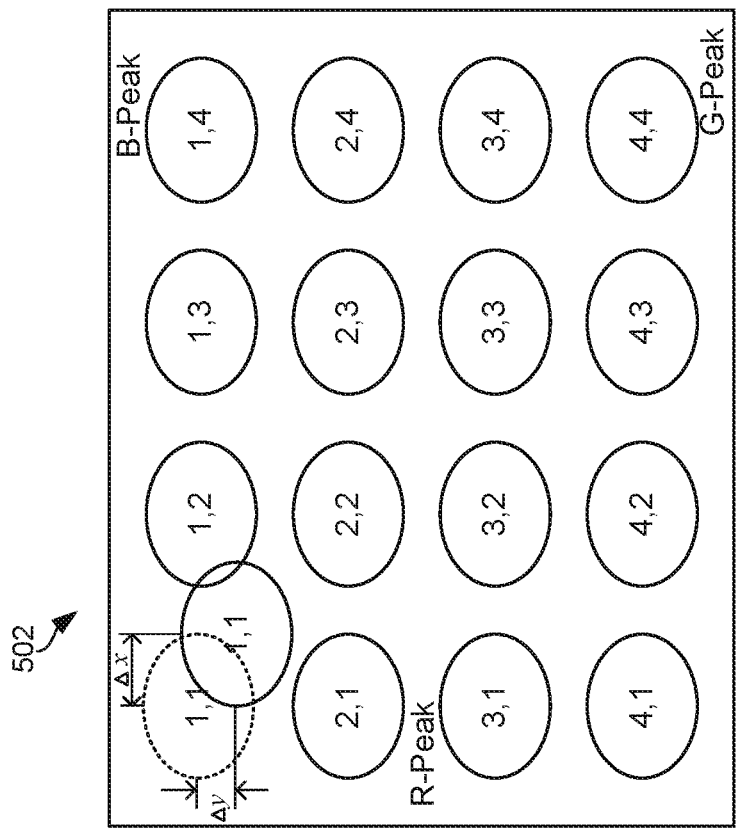
FIG. 5 shows an exemplary color image captured by one of the cameras introduced in FIG. 1 when one of the mirrors in a mirror array is tilted along both its horizontal and vertical axes, and all of the other mirrors in the mirror array are not tilted.

As can be appreciated from the exemplary color image 402 shown in FIG. 4, when all of the first mirrors 124a of the first mirror array 122a are not tilted (and thus, are parallel to one another), the geometric shapes (ellipses in this example) included in the color image 402 will be uniformly spaced apart from one another. FIG. 5 shows an exemplary color image 502, where the first mirror 124a labeled 1,1 has been tilted along both its x-axis and y-axis (i.e., tilted both vertically and horizontally), while all of the other first mirrors 124a of the first mirror array 122a are not tilted. As can be appreciated from FIG. 5, the ellipse labeled 1,1 corresponding to the tilted first mirror 124a labeled 1,1 has moved or been displaced from its original location (shown in dotted line). The displacement in the x-direction (i.e., the horizontal direction) is represented as $\Delta x$, and the displacement in the y-direction (i.e., the vertical direction) is represented as $\Delta y$. Each different displacement of an ellipse in the x-direction (i.e., horizontal direction) corresponds to a different $\Delta x$, which corresponds to a different horizontal tilt angle of the mirror 124 represented by the ellipse in the color image 402. Also, each different displacement of an ellipse in the y-direction (i.e., vertical direction) corresponds to a different $\Delta y$, which corresponds to a different vertical tilt angle of the mirror 124 represented by the ellipse in the color image 402.

During a calibration process, while all of the first mirrors 122a of the first mirror array are not tilted, the color coded alignment light beam 144a can be directed toward and reflected from the first mirror array 122a, and the first camera 152a can be used to obtain a color image of the reflected color coded alignment light beam 144a (directly, or using a front or rear projection screen). Image processing, and more specifically edge detection, can then be performed to detect each of the ellipses (or more generally, geometric shapes) in the color image. For each ellipse (and more generally, geometric shape) included in the color image that corresponds to a mirror 124a in the mirror array 122a, two color ratios can be calculated for one or more pixels that define the ellipse. The color ratios can include a ratio of red relative to blue (which can be referred to as an RB value or ratio), and a ratio of green relative to blue (which can be referred to as a GB value or ratio). Each RB value can be calculated using the equation RB=R/B; and each GB value can be calculated using the equation GB=G/B, where R, G and B are 8 bit values output by pixels of the camera 152 (with the values being indicative, respectively, of the R light, G light, and B light detected by the pixels). A potential problem with using the above noted equations is that the RB and GB values may be very large where the B value is very small. Thus, preferred equations to determine the color ratios are RB=R/(R+B); and GB=G/(G+B). It would also be possible to use alternative equations. The color ratios can be determined for every pixel of a geometric shape (e.g., ellipse) that corresponds to a first mirror 124a, for all or some of the pixels corresponding to an edge of the geometric shape (e.g., ellipse) that corresponds to a first mirror 124a, or for all or some of the pixels just inside the edge of the geometric shape (e.g., ellipse) that corresponds to a first mirror 124a, depending upon implementation. Such color ratio values can be stored within a matrix in the memory that is included within the controller 132, or is accessible by the controller 132. For example, referring to FIG. 4: for the ellipse labeled 1,1 in the color image 402, a plurality of RB and GB values can be stored; for the ellipse labeled 1,2 in the color image 402, a plurality of RB and GB values can be stored; . . . for the ellipse labeled 4,4 in the color image 402, a plurality of RB and GB values can be stored. At later times, during operation of the optical cross connect 102, these stored RB and GB values can be accesses from memory and used to determine which geographic shapes included in color images obtained during operation of the optical cross connect 102 correspond to which first mirror 124a.

Additionally, during the calibration process, each of the first mirrors 124a can be tilted incrementally both vertically and horizontally, and color images can be obtained and subjected to image processing in order to determine how different vertical and horizontal shifts in the position of a geographic shape (e.g., ellipse) representative of a specific fist mirror 124a in the color image correspond to different tilt angles. Such information can also be stored in the matrix stored in memory.

Mirror control signal information, which specifies the mirror control signals used to achieve various tilt angles during the calibration process, can also be stored in the matrix stored in the memory. More specifically, the matrix stored in memory could also include mirror control signal information that specifies: the mirror control signals to use to cause the first mirror 124a labeled 1,1 to reflect a cross-connection light beam towards the second mirror 124b labeled 1,1; the mirror control signals to use to cause the first mirror 124*a* labeled 1,1 to reflect a cross-connection light beam towards the second mirror 124*b* labeled 1,2; . . . . the mirror control signals to use to cause the first mirror 124*a* labeled 1,1 to reflect a cross-connection light beam towards the second mirror 124*b* labeled 4,4. The matrix stored in memory could also include geographic shape (e.g., ellipse) location information, which specifies where the geographic shape (e.g., ellipse) corresponding to a first mirror 124*a* should be located in a color image: to reflect a cross-connection light beam towards the second mirror 124*b* labeled 1,1; to reflect a cross-connection light beam towards the second mirror 124*b* labeled 1,2; . . . . to reflect a cross-connection light beam towards the second mirror 124*b* labeled 4,4. Similarly mirror control signal information and geographic shape location information could be obtained for each of the other first mirrors 124*a* in the first mirror array 122*a*. More generally, during the calibration process, for each first mirror 124*a* in the first mirror array 122*a*, mirror control signal information that specifies how the first mirror 124*a* should be controlled to reflect light towards each of the second mirrors 124*b* in the second mirror array could be determined and saved; and geographic shape location information corresponding where in a color image the geometric shape (e.g., ellipse) should be located to reflect light towards each of the second mirrors 124*b* in the second mirror array 122*b* could be determined and saved. Additionally, during the calibration processes, image processing can also be performed on color images obtained using the second camera 152*b*, and for each second mirror 124*b* in the second mirror array 122*b*, mirror control signal information that specifies how each second mirror should be controlled to reflect light (received from each of the first mirrors 124*a* in the first mirror array 122*a*) towards its respective second collimator 114*b* in the second collimator array 112*b* could be determined and saved. Where the optical cross connect 102 is bi-directional, additionally or alternatively during the calibration process, for each second mirror 124*b* in the second mirror array 122*b*, mirror control signal information that specifies how the second mirror 124*b* should be controlled to reflect light towards each of the first mirrors 124*a* in the first mirror array 122*a* could be determined and saved; and geographic shape location information corresponding where in a color image the geometric shape (e.g., ellipse) should be located to reflect light towards each of the first mirrors 124*a* in the first mirror array 122*a* could be determined and saved.

The mirror control signal information stored during the calibration process is essentially the baseline mirror control signal information that can be used to control mirrors 124 of the first and second mirror arrays 122*a* and 122*b* during operation of the optical cross connect 102, if the operating conditions (e.g., temperature and atmospheric pressure) were identical to the conditions during the calibration process. However, during actual operation of the optical cross connect 102, variations in the temperature and atmospheric pressure may occur. In order to compensate for such variations in the temperature and atmospheric pressure, closed loop feedback can be used. For example, based on information stored during the calibration process, the controller 132 can know where a specific ellipse corresponding to a specific first mirror 124*a* should be spatially located in a color image obtained using the camera 152*a* in order to reflect a cross-connection light beam to a specific second mirror 124*b*. Similarly, based on information stored during the calibration process, the controller 132 can know where a specific ellipse corresponding to a specific second mirror 124*b* should be spatially located in a color image obtained using the camera 152*b* in order to reflect a cross-connection light beam from a specific second mirror 124*b* towards a respective second collimator 114*b*. If spatial locations of ellipses in color images differ or deviate from where they should be, then mirror control signals can be modified to move the spatial locations of ellipses in color images to where they should be, during a closed loop feedback operation. Further, because each ellipse that is representative of a specific first mirror 124*a* in a color image obtained using the camera 152*a* will have its own unique combination of colors, the controller 132 can accurately distinguish between the ellipses (and more generally, geometric shapes) included in the color image. The same is true for a color image obtained using the second camera 152*b*.

The high level flow diagram in FIG. 6 will now be used to summarize a method 600 according to an embodiment of the present technology, which can be used to perform closed loop feedback used to control tilt angles of mirrors 124 within a mirror array 122. The steps described with reference to FIG. 6 can be performed separately yet simultaneously for both the first mirror array 122*a* and the second mirror array 122*b*. Referring to FIG. 6, step 602 involves directing a color coded alignment light beam (e.g., 144*a*, 144*b*) towards a mirror array (e.g., 122*a*, 122*b*) so that the color coded alignment light beam is reflected therefrom. Step 604 involves capturing a color image of the color coded alignment light beam (e.g., 144*a*, 144*b*) reflected from the mirror array (e.g., 122*a*, 122*b*). As explained above, the color image captured at step 604 will include an array of color coded geometric shapes (e.g., ellipses), wherein each color coded geometric shape in the array of color coded geometric shapes corresponds to a different one of the mirrors (e.g., 124*a*, 124*b*). Step 606 involves performing image processing on the color image to thereby detect tilt angle information for mirrors (e.g., 124*a*, 124*b*) in the mirror array (e.g., 122*a*, 122*b*). Step 608 involves controlling tilt angles of mirrors (e.g., 124*a*, 124*b*) in the mirror array (e.g., 122*a*, 122*b*) based on the detected tilt angle information. Step 608 can include determining whether tilt angles of specific mirror within a mirror array need to be adjusted to optimize how cross-connection light beams that are being switched by the optical cross connect, and more specifically, reflected mirrors of a mirror array, need to be adjusted to compensate for changes in temperature and/or atmospheric pressure. Step 608 can also include adjusting mirror control signals to cause the appropriate adjustments to the tilt angles.

Instances of step 602 can be performed by the driver 140*a* and the alignment light source 142*a*, and by the driver 140*b* and the alignment light source 142*b* discussed above with reference to FIG. 1. Instances of step 604 can be performed using the cameras 152*a* and 152*b* discussed above with reference to FIG. 1. Instances of steps 606 and 608 can be performed by the controller 132 discussed above with reference to FIG. 1. Exemplary additional details of the controller 132 are described below with reference to FIG. 10.

The flow diagram of FIG. 7 will now be used to described in additional details of step 606 in FIG. 6, and more specifically, will be used to provide details of how to perform image processing on the color image (captured at an instance of step 604) to thereby detect tilt angle information for mirrors (e.g., 124*a*, 124*b*) in a mirror array (e.g., 122*a*, 122*b*). Referring to FIG. 7, step 702 involves performing edge detection to detect one or more of the color coded geometric shapes included in the color image. Edge detection is an image processing technique for finding the boundaries of objects within images, and often works by detecting discontinuities in brightness. Exemplary edge detection algorithms that can be used to perform step 702 include, but are not limited to, Sobel, Canny, Prewitt, Roberts, and fuzzy logic methods. The color coded geometric shapes (included in the color image) that may be detected at step 702 can include full ellipses representative of mirrors, or can include just arcs of the ellipses (i.e., portions of boundaries of ellipses). Additional details of step 702, according to an embodiment of the present technology, are described below with reference to FIG. 8. Still referring to FIG. 7, step 704 involves associating detected color coded geometric shapes in the color image with respective mirrors in a mirror array. For example, at step 704 it can be determined that the ellipse labeled 1,1 in the color image 502 shown in FIG. 5 is associated with the mirror 124 labeled 1,1 in the mirror array 122 shown in FIG. 3. Additional details of step 704, according to an embodiment of the present technology, are described below with reference to FIG. 9. Step 706 involves determining spatial positions of the detected color coded geometric shapes in the color image. Step 708 involves determining tilt angles associated with mirrors in the mirror array based on the determined spatial positions, within the color image, of the color coded geometric shapes. For example, by knowing the distance between a camera 152 (or screen 154) and the mirror array 122 from which a color coded alignment light beam was reflected towards the camera 152 (or the screen 154), and by determining deviations from positions corresponding to when mirrors are not tilted (e.g., by determining $\Delta x$ and $\Delta y$), tilt angles $\Delta x$ and $\Delta y$ of a mirror can be determined using the equations: $\Delta x = \arcsin(\Delta x/L)$ and $\Delta y = \arcsin(\Delta y/L)$, where L is the distance between the camera 152 (or the screen 154) and the mirror array 122. Alternative equations and techniques can be used to determine tilt angles associated with mirrors in mirror array based on the determined spatial positions, within a color image, of color coded geometric shapes.

Figures 8, 9:
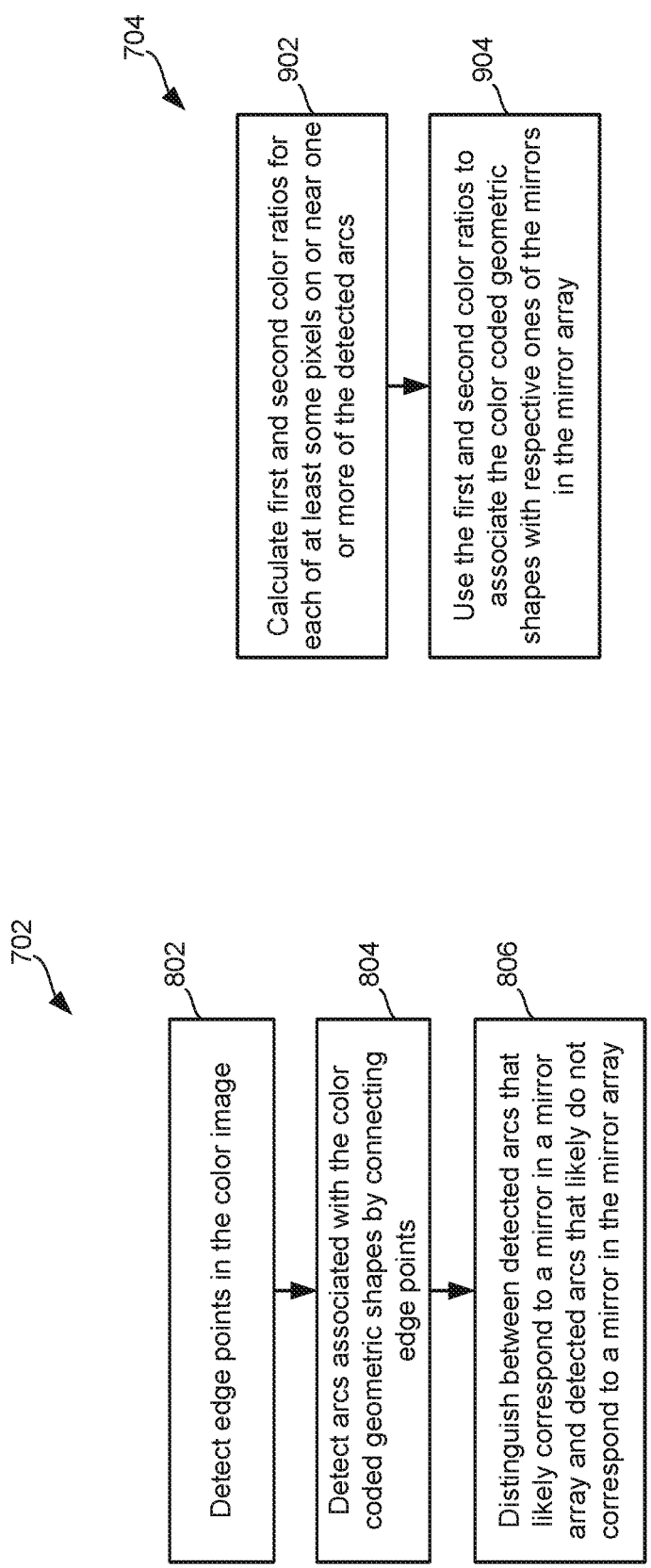
FIG. 8 is a flow diagram used to describe additional details of step 702 in FIG. 7, and more specifically, used to provide details of how edge detection can be performed to detect color coded geometric shapes included in a color image, in accordance with an embodiment.
FIG. 9 is a flow diagram used to describe additional details of step 704 in FIG. 7, and more specifically, used to provide details of how color coded geometric shapes in a color image can be associated with (in other words, matched with) respective mirrors in a mirror array, in accordance with an embodiment.

The flow diagram of FIG. 8 will now be used to describe additional details of step 702 in FIG. 7, and more specifically, will be used to provide details of how edge detection can be performed to detect color coded geometric shapes included in a color image. Referring to FIG. 8, step 802 involves detecting edge points from the color image. Step 802 can be performed by detecting discontinuities in brightness and/or colors, but are not limited thereto. Step 804 involves detecting arcs associated with color coded geometric shapes by connecting edge points detected at step 802. Step 806 involves distinguishing between detected arcs that likely correspond to a mirror in a mirror array and detected arcs that likely do not correspond to a mirror in the mirror array. Step 806 can be performed, for example, by determining a radius of a detected arc, and determining whether the radius is within an expected range. If the radius is within the expected range then it can be surmised that the arc represents a portion of a mirror represented in the color image. If the radius is outside the expected range then it can be surmised that the arc does not represents a portion of a mirror represented in the color image. Accordingly, step 806 can be used to filter out or otherwise ignore detected arcs that likely do not represent mirrors (or portions thereof) in a color image.

The flow diagram of FIG. 9 will now be used to describe additional details of step 704 in FIG. 7, and more specifically, will be used to provide details of how color coded geometric shapes in a color image can be associated with (in other words, matched with) respective mirrors in a mirror array. Referring to FIG. 9, step 902 involves calculating first and second color ratios, for at least some pixels on or near one or more of the detected arcs. Each first color ratio can be a ratio of a first color relative to a third color, and each second color ratio can be a ratio of a second color relative to the third color. For example, each first color ratio can be a ratio of red relative to blue (which can be referred to as an RB value or ratio), and each second color ratio can be a ratio of green relative to blue (which can be referred to as a GB value or ratio). Each RB value can be calculated using the equation RB=R/B; and each GB value can be calculated using the equation GB=G/B. Alternatively, each RB value can be calculated using the equation RB=R/(R+B); and each GB value can be calculated using the equation GB=G/(G+B). It would also be possible to use alternative equations. The color ratios can be determined for every pixel of a geometric shape (e.g., ellipse or arc thereof) that corresponds to a mirror, for all or some of the pixels corresponding to an edge of the geometric shape (e.g., ellipse or arc thereof) that corresponds to a mirror. Step 904 involves using the first and second color ratios to associate (in other words, match) one or more of the color coded geometric shapes with respective ones of the mirrors in the mirror array. Step 904 can be performed by comparing RB and GB values, determined during operation of the optical cross connect 102, to RB and GB values determined and saved during the calibration process that was performed for the optical cross connect. Since each mirror represented in a color image (of a color coded alignment light beam reflected from a mirror array) will have its own unique combination of R, G and B colors, the RB and GB values can be used to match arcs within the color image to mirrors within a mirror array.

Figure 10:
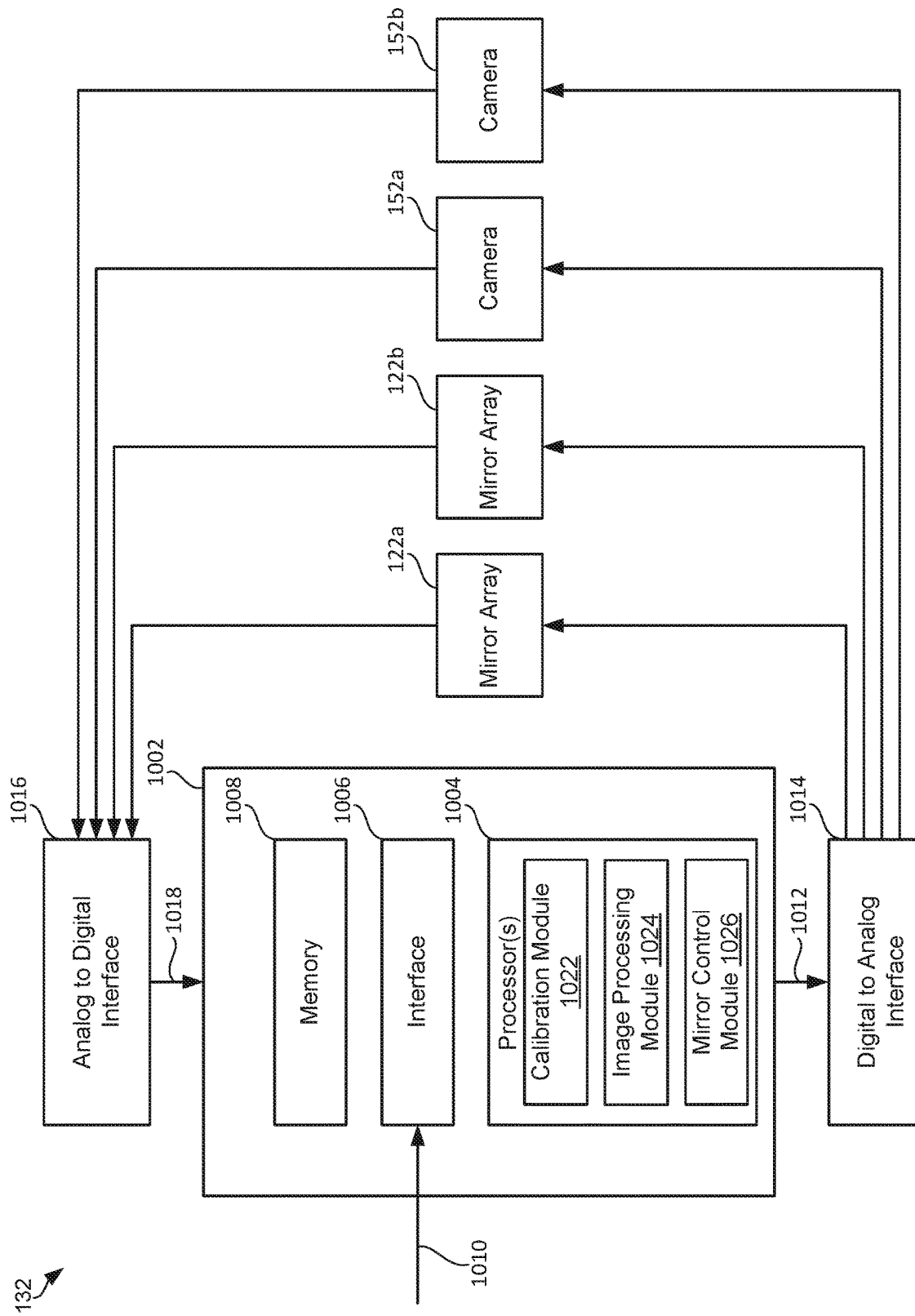
FIG. 10 is a block diagram illustrating exemplary details of the controller of the optical cross connect introduced in FIG. 1.

The block diagram of FIG. 10 will now be used to describe exemplary details of the controller 132 of the optical cross connect 102. Referring to FIG. 10, the controller 132 is shown as including a computer 1002 including one or more processors 1004, an interface 1006, and memory 1008. The processor(s) 1004 can perform image processing and computations required to implement a closed-loop feedback control system for the optical cross connect 102. The processor(s) 1004 can include various computation or processing units. In accordance with an embodiment, the processor(s) 1004 include at least one graphical processing unit (GPU) that is used to perform the image processing described above.

The interface 1006 provides an electronic interface between the computer 1002 and a telecommunication exchange via an interconnect 1010. In a typical environment incorporating the optical cross connect 102, the interconnect 1010 can receive switching information about the input fibers and output fibers that are to be optically coupled. A standard format for receiving this information may be established by a particular telecommunications network, but it is to be appreciated that regardless of the particular protocol, this information will contain particular switch configurations which may be implemented by the embodiments of the present technology.

The memory 1008 may include both temporary and permanent digital memory media. For example, the memory 1008 may include various types of memory, such as, but not limited to, static random access memory (SRAM), dynamic random access memory (DRAM), synchronous DRAM (SDRAM), read-only memory (ROM), a combination thereof, or the like. In an embodiment, the memory 1008 may include ROM for use at boot-up, and DRAM for program and data storage for use while executing programs. In embodiments, the memory 1008 is non-transitory. The memory 1008 may store various tables and matrices that specify color ratio values (e.g., RB and GB values) associate with specific mirrors of mirror arrays. The memory 1008 can also store various other information obtained during a calibration process associated with the optical cross connect 102, which information is used during operation of the optical cross connect 102.

The computer 1002 is shown as being electrically connected to a digital to analog interface 1014 via an electrical connection 1012, and being electrically connected to an analog to digital interface 1016 via an electrical connection 1018. Depending upon implementation, the digital to analog interface 1014 and the analog to digital interface 1016 can be considered part of the controller 132, or can be external to the controller 132. The digital to analog interface 1014 can include amplifiers, and digital to analog converters that convert digital information from the computer 1002 to the analog signals necessary to control the mirrors 124 of the mirror arrays 122, as well as to control the cameras 152. The mirror control signals for a single mirror 124 of a mirror array 122 can rotate the mirror about two perpendicular axes in order to direct a cross-connection beam in its desired direction. In order to ensure that the mirrors are properly positioned, the cameras 152 are used to obtain color images of color coded alignment light beams reflected from the mirror arrays 122 to determine actual tilt angles of mirrors 124, which can be used in closed loop feedback to adjust the tilt angles of the mirrors 124 when necessary. The analog to digital interface 1016 can include analog signal conditioning components, including analog amplifiers and analog to digital converters, which receive the analog signals from image sensors of the cameras 152 and generate digital signals for transmission along electrical connection 1018 to the computer 1002. Where the cameras 152 output digital signals, such digital signals can be provided to the computer 1002 without any analog to digital conversions. The digital to analog interface 1016 can also receive analog signals from the mirror arrays 122. Where the cameras 152 are responsive to digital signals, such digital signals can be provided from the computer 1002 to the cameras 152 without any digital to analog conversions.

The computer 1002 can determine the tilt angles of the first mirrors 124*a* of the first mirror array 122*a*, and the second mirrors 124*b* of the second mirror array 124*b*, based on color images obtained by the first and second cameras 152*a* and 152*b*. The computer 1002 can compare these tilt angles to desired tilt angles stored in the memory 1008 to determine whether mirrors are properly tilted. If there is a difference between actual tilt angles and desired tilt angles, mirror control signals can be modified to adjust tilt angles.

In some embodiments, the processor(s) 1004 can include a calibration module 1022, an image processing module 1024, and a mirror control module 1026. The calibration module 1022 can include instructions for controlling the calibration process described above. The image processing module 1024 can include instructions for performing the image processing of color images, obtained using the cameras 152*a* and 152*b*, as described above. The mirror control module 1026 can include instructions for controlling the first mirrors 124*a* of the first mirror array 122*a* and the second mirrors 124*b* of the second mirror array during both calibration and operation of the optical cross connect 102. More generally, each of the modules 1022, 1024, 1026 can be implemented using software, firmware, hardware, or combinations thereof. Each of the modules can be divided into submodules or combined into larger modules. The controller 132 can also include additional modules. Instructions for one or more of the aforementioned modules can additionally, or alternatively, be stored in the memory 1008.

In the embodiments described above, the optical cross connect 102 was shown and described as including a single controller 132. However, it should be noted that the functions of the controller 132 can be performed by multiple different components all of which can be considered parts of the controller 132, and each of which can be considered sub-controllers or modules of the controller 132. For example, a sub-controller can control how the mirrors 124 of the mirror arrays 122 are controlled based on switching information received via the interconnect 1010, another sub-controller can perform image processing of color images obtained using the cameras 152, and another sub-controller can make adjustments to the mirrors based on results of the image processing. These are just a few examples of how the controller 132 can include multiple sub-controllers, which is not intended to be all encompassing. Each such sub-controller may include one or more of its own processor(s) 1004, or multiple sub-controllers can share the same processor(s) 1004, depending upon implementation. More generally, each sub-controller can be implemented using software, firmware, hardware, or combinations thereof.

Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment. Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

Some embodiments herein may be implemented in computer-readable non-transitory media that includes all types of computer readable media, including magnetic storage media, optical storage media, and solid state storage media and specifically excludes signals.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

What is claimed is:

1. An optical cross connect, comprising:
    a first collimator array including a plurality of first collimators, and a second collimator array including a plurality of second collimators;
    a first mirror array including a plurality of first mirrors, and a second mirror array including a plurality of second mirrors;
    each first mirror of the first mirror array configured to reflect a light beam, directed towards the first mirror by a respective one of the first collimators, towards a selected one of the second mirrors of the second mirror array;
    each second mirror of the second mirror array configured to reflect a light beam, directed towards the second mirror by the first mirror array, towards a respective one of the second collimators;
    a light source configured to emit a color coded light beam towards the first mirror array;
    a camera configured to capture a color image of the color coded light beam reflected from the first mirror array, wherein the color image includes an array of color coded geometric shapes; and
    a controller configured to perform image processing on the color image, and configured to control one or more of the first mirrors in the first mirror array based on results of the image processing.

2. The optical cross connect of claim 1, wherein the controller is configured to determine tilt angle information for one or more of the first mirrors in the first mirror array based on results of the image processing, and is configured to control tilt angles of one or more of the first mirrors in the first mirror array based on the tilt angle information.

3. The optical cross connect of claim 2, wherein the controller is configured to:
    perform edge detection to detect one or more of the color coded geometric shapes included in the color image;
    detect spatial positions of one or more of the detected color coded geometric shapes in the color image;
    associate one or more of the color coded geometric shapes in the color image with a respective one of the first mirrors in the first mirror array; and
    determine tilt angles associated with one or more of the first mirrors in the first mirror array based on the spatial positions of one or more of the color coded geometric shapes.

4. The optical cross connect of claim 2, further comprising:
    a second light source configured to emit a second color coded light beam towards the second mirror array; and
    a second camera configured to capture a second color image of the second color coded alignment light beam reflected from the second mirror array;
    wherein the controller is configured to perform image processing on the second color image to thereby determine tilt angle information for one or more of the second mirrors in the second mirror array, and configured to control tilt angles of one or more of the second mirrors in the second mirror array based on the tilt angle information.

5. The optical cross connect of claim 1, wherein the light source includes first, second and third light emitting elements configured to respectively emit first, second and third colors of visible light that differ from one another.

6. The optical cross connect of claim 1, wherein:
    the color coded alignment light beam includes multiple different colors of light that are spatially dispersed in a non-uniform manner; and
    each of the color coded geometric shapes in the array of color coded geometric shapes includes a different combination of the multiple different colors of light and corresponds to a different one of the first mirrors.

7. The optical cross connect of claim 1, wherein the color coded light beam reflected by the first mirror array is incident on the camera so that the camera captures the color image of the color coded light beam reflected from the first mirror array.

8. The optical cross connect of claim 1, further comprising a screen that is located at a distance from the camera;
    wherein the camera captures the color image of the color coded light beam reflected from the first mirror array via the screen, and the camera is smaller in size than the first mirror array.

9. The optical cross connect of claim 1, wherein:
    the first mirror array includes a two-dimensional (2D) array of the first mirrors, and the second mirror array includes a 2D array of the second mirrors; and
    each of the first mirrors in the 2D array of first mirrors, and each of the second mirrors in the 2D array of second mirrors, comprises a bi-axial mirror configured to be tilted along first and second axes that are perpendicular to one another.

10. The optical cross connect of claim 1, wherein the optical cross connect is bi-directional.

11. A method for controlling one or more mirrors of an optical cross connect, comprising:
- directing, by a light source, a color coded light beam towards a first mirror array comprising a plurality of first mirrors;
- capturing, by a camera, a color image of the color coded light beam reflected from the first mirror array, wherein the color image includes an array of color coded geometric shapes;
- processing, by a controller, the color image to decide tilt angle information for one or more of the first mirrors in the first mirror array; and
- controlling, by the controller, tilt angles of one or more of the first mirrors in the first mirror array based on the tilt angle information.

12. The method of claim 11, further comprising:
- directing, by a second light source, a second color coded light beam towards a second mirror array comprising a plurality of second mirrors, wherein the second color coded light beam includes multiple different colors of light that are spatially dispersed in a non-uniform manner;
- capturing, by a second camera, a second color image of the second color coded light beam reflected from the second mirror array, wherein the second color image includes an array of color coded geometric shapes;
- processing, by the controller, the second color image to decide tilt angle information for one or more second mirrors in the second mirror array; and
- controlling, by the controller, tilt angles of one or more of the second mirrors in the second mirror array based on the tilt angle information for one or more second mirrors in the second mirror array.

13. The method of claim 11, wherein processing the color image to decide tilt angle information for one or more of the first mirrors in the first mirror array, comprises:
- performing edge detection to detect one or more of the color coded geometric shapes included in the color image;
- associating each of one or more of the detected color coded geometric shapes in the color image with a respective one of the first mirrors in the first mirror array;
- determining spatial positions of one or more of the detected color coded geometric shapes in the color image; and
- determining tilt angles associated with one or more of the first mirrors in the first mirror array based on the determined spatial positions of one or more of the detected color coded geometric shapes in the color image.

14. The method of claim 13, wherein the performing edge detection to detect one or more of the color coded geometric shapes included in the color image, comprises:
- detecting edge points in the color image;
- detecting arcs associated with the color coded geometric shapes by connecting edge points; and
- distinguishing between detected arcs that correspond to a first mirror in the first mirror array and detected arcs that do not correspond to a first mirror in the first mirror array.

15. The method of claim 14, wherein the color coded light beam includes first, second, and third colors of visible light that differ from one another; and wherein the associating one or more of the color coded geometric shapes in the color image with a respective one of the first mirrors in the first mirror array comprises:
- calculating first and second color ratios, for at least one pixel on or near at least one of the detected arcs, wherein the first color ratio is a ratio of the first color relative to the third color, and the second color ratio is a ratio of the second color relative to the third color; and
- associating one or more of the color coded geometric shapes in the color image with a respective one of the first mirrors in the first mirror array based on the first and second color ratios.

16. The method of claim 11, wherein:
- the color coded alignment light beam includes multiple different colors of light that are spatially dispersed in a non-uniform manner; and
- each of the color coded geometric shapes in the array of color coded geometric shapes includes a different combination of the multiple different colors of light and corresponds to a different one of the first mirrors.

17. A controller to control an optical cross connect, comprising:
- a non-transitory memory storage comprising instructions; and
- one or more processors in communication with the memory, wherein the one or more processors execute the instructions to:
    - perform edge detection to detect one or more of a color coded geometric shapes included in a color image of a color coded light beam reflected by a first mirror array comprising a plurality of first mirrors;
    - detect spatial positions of one or more of the detected color coded geometric shapes in the color image;
    - associate one or more of the color coded geometric shapes in the color image with a respective one of the first mirrors in the first mirror array;
    - determine tilt angle information associated with one or more of the first mirrors in the first mirror array based on the spatial positions of one or more of the color coded geometric shapes; and
    - control tilt angles of one or more of the first mirrors in the first mirror array based on the tilt angle information.

18. The controller of claim 17, wherein the instructions to perform edge detection comprise instructions to:
- detect edge points in the color image;
- detect arcs associated with the color coded geometric shapes by connecting edge points; and
- distinguish between detected arcs that correspond to a first mirror in the first mirror array and detected arcs that do not correspond to a first mirror in the first mirror array.

19. The controller of claim 18, wherein the color coded light beam includes first, second, and third colors of visible light that differ from one another; and
wherein the instructions to associate one or more of the color coded geometric shapes in the color image with a respective one of the first mirrors in the first mirror array comprise instructions to:
- calculate first and second color ratios, for at least one pixel on or near at least one of the detected arcs, wherein the first color ratio is a ratio of the first color relative to the third color, and the second color ratio is a ratio of the second color relative to the third color; and associate one or more of the color coded geometric shapes in the color image with a respective one of the first mirrors in the first mirror array based on the first and second color ratios.

20. The controller of claim 17, wherein the instructions further comprise instructions to:
perform edge detection to detect one or more of a color coded geometric shapes included in a color image of a second color coded light beam reflected by a second mirror array comprising a plurality of second mirrors;
detect spatial positions of one or more of the detected color coded geometric shapes in the color image of the second color coded light beam;
associate one or more of the color coded geometric shapes in the color image of the second color coded light beam with a respective one of the second mirrors in the second mirror array;
determine second tilt angles information associated with one or more of the second mirrors in the second mirror array based on the spatial positions of one or more of the color coded geometric shapes in the color image of the second color coded light beam; and
control tilt angles of one or more of the second mirrors in the second mirror array based on the second tilt angles information.

* * * * *

UNITED STATES PATENT AND TRADEMARK OFFICE
CERTIFICATE OF CORRECTION

PATENT NO. : 10,788,658 B2
APPLICATION NO. : 15/866775
DATED : September 29, 2020
INVENTOR(S) : Gong et al.

Page 1 of 1

It is certified that error appears in the above-identified patent and that said Letters Patent is hereby corrected as shown below:

In the Claims

Column 26, Line 30: After "more" and before "color" delete "of a".

Column 27, Line 7: After "more" and before "color" delete "of a".

Column 27, Line 18: After "tilt" and before "information" delete "angles" and insert -- angle --.

Signed and Sealed this
Fifteenth Day of December, 2020

Andrei Iancu
*Director of the United States Patent and Trademark Office*